United States Patent [19]

Sepehri-Nik

[11] 4,324,577
[45] Apr. 13, 1982

[54] METHOD AND APPARATUS FOR BENEFICIATING PHOSPHATE ORES

[75] Inventor: Hossein K. Sepehri-Nik, Luling, La.

[73] Assignee: Beker Industries, Inc., Greenwich, Conn.

[21] Appl. No.: 123,965

[22] Filed: Feb. 25, 1980

[51] Int. Cl.³ ............................................. C05B 13/02
[52] U.S. Cl. ........................................... 71/33; 71/44; 209/8; 209/11; 209/214; 426/807; 423/305
[58] Field of Search .............. 71/32, 33, 44, 48, 64 A, 71/64 R, DIG. 3, 64.1, 64.13; 423/167, 305, DIG. 16; 209/4, 8, 11, 214; 252/62.51, 62.55, 62.56; 148/103, 108; 241/39, 47, 79.1; 426/807

[56] References Cited

U.S. PATENT DOCUMENTS

| | | | |
|---|---|---|---|
| 2,528,552 | 11/1950 | Royster | 209/8 X |
| 3,032,190 | 5/1962 | LeBaron | 209/214 X |
| 3,225,923 | 12/1965 | Lawyer | 209/4 |
| 3,684,090 | 8/1972 | Kilbride | 209/214 |
| 3,901,795 | 8/1975 | Smith et al. | 209/214 X |
| 4,083,929 | 4/1978 | Priestley | 423/DIG. 16 |

*Primary Examiner*—S. Leon Bashore
*Assistant Examiner*—Ferris H. Lander
*Attorney, Agent, or Firm*—H. Hume Mathews

[57] ABSTRACT

Method and apparatus for producing high grade phosphate rock from low grades, slime or tailings by subjecting the low grade rock, slime or tailings to a calcination treatment at a temperature within the range from 1000° F. to 1600° F., and preferably from 1400° F. to 1600° F., until a fraction of said rock, slime or tailings becomes magnetically attractable, and subjecting the treated material to a high strength magnetic field to separate the same magnetically into at least two fractions, one of increased BPL and one of decreased BPL.

4 Claims, 3 Drawing Figures

METHOD AND APPARATUS FOR BENEFICIATING PHOSPHATE ORES

BACKGROUND OF THE INVENTION

Steadily growing worldwide production of phosphate-based agricultural fertilizers such as diammonium phosphate, triple superphosate and superphosphoric acid, and of animal feed supplement such as dicalcium phosphate has resulted in ever increasing consumption of the principal raw material, phosphate rock, used for the manufacture of these end products.

The most desirable grades of phosphate rock, those with the highest BPL, are now scarce. BPL is the short name used in the art for bone phosphate of lime, or tri-calcium phosphate. Phosphate rock with a BPL concentration of 75 or higher were available and used some years ago for industrial manufacture of the end products referred to above. Today the BPL of the rock used is down to 68 and lower. In the future it is expected that the industry will have to use rock with BPL's as low as 64, and lower.

There exists large reserves of phosphate rock of less than 64 BPL. Expressed as phosphorus pentoxide ($P_2O_5$) equivalent (the customary measure of phosphorus content used in the fertilizer industry) this would be 29.3% $P_2O_5$. It generally is considered at the present time to be uneconomical to use such low BPL rock industrially. For the manufacture by wet-phosphoric acid processes of the end products mentioned above, phosphate rock of less than 64 BPL (29.3% $P_2O_5$) is not economical.

Thus there exists a need which is expected to increase in the future for a new low cost, economical and industrially acceptable method for upgrading or beneficiating phosphate rock of low BPL.

There also exists a need for a new low cost, economical method which is industrially acceptable for upgrading or beneficiating phosphatic rock, slime, or tailings. Nearly one-third of all the phosphate rock mined and washed ends up as slime or tailings, which have phosphatic values (BPL) so low that they cannot be used economically for the manufacture of fertilizer or animal feed products. If the BPL concentration of these slimes or tailings can be increased sufficiently by a low cost commercially practicable method, then such slime or tailings could be used for the manufacture of fertilizer and animal feed products rather than being discarded as waste.

PRIOR ART

A method used for the beneficiation of phosphate rock is shown in FIG. 3 of the Article entitled "Solving Problems in Chemical Processing of Low Quality Phosphate Rock", which appeared in the September 1977 issue of the *Engineering and Mining Journal*.

Magnetic separation of a magnesite ore is illustrated in U.S. Pat. No. 3,936,372, issued Feb. 3, 1976, and of an alumina-silica ore in U.S. Pat. No. 3,860,514 issued Jan. 14, 1975.

Beneficiation of magnetite-apatite ores utilizing magnetic separation is disclosed in Haseman U.S. Pat. No. 3,022,956; and of low grade phosphatic ores containing relatively large proportions of iron and aluminum impurities in Adam et. al. U.S. Pat. No. 3,032,189 issued May 1, 1962 and Le Baron U.S. Pat. No. 3,032,190 issued May 1, 1962.

Methods for the beneficiation of phosphate rock, including separation of impurities by abrasion, screening, washing, flotation, heating, drying and air-classifying are disclosed in U.S. Pat. No. 3,329,352 issued July 4, 1967. A companion patent, U.S. Pat. No. 3,329,351 also issued July 4, 1967, discloses a dry process for the beneficiation of phosphate rock in which, after the phosphate matrix is dried and air-classified to produce pebble phosphate and fine particles of phosphate rock, the fine particles of phosphate rock are then electrostatically separated from fine particles of silica and agglomerated clay.

However, none of the prior art referred to above, or known to applicant, discloses the novel and improved magnetic method of beneficiating phosphate rock, slime or tailings as disclosed in this application.

SUMMARY OF THE INVENTION

The primary objective of the present invention is to provide a new and improved method or process for treating low grade phosphate rock, of the types used in the industrial processes presently practiced for the commercial manufacture of phosphate-based agricultural fertilizer and animal feed supplements, so as substantially to increase the BPL of said low grade rock. A related objective is to provide a new and improved method for increasing substantially the BPL of phosphate rock slime or tailings so as to increase the BPL thereof to the level where they are acceptable for use in said industrial fertilizer and animal feed manufacturing processes.

The new and improved method or process of the present invention comprises calcining the phosphate ore matrix (preferably after it has been beneficiated in the conventional way by washing, screening and flotation to deslime and remove tailings,) by heating the same to a temperature within a critical temperature range, then subjecting the calcined matrix or rock to an extremely strong magnetic field to separate the matrix or rock into at least two fractions, one of which is responsive to a strong magnetic field and the other of which is not magnetically responsive, determining the BPL of each fraction relative to the BPL of the original matrix or rock prior to magnetic separation, and using that fraction having a BPL higher than the BPL of the original matrix as feed stock for the phosphate fertilizer and/or animal feed supplement manufacturing process.

Phosphate rock slime or tailings can similarly be separated according to the invention into upgraded fractions and low grade fractions by the same method. The upgraded slime or tailings fraction, after separation thereof by a strong magnetic field, can be mixed or blended with high grade phosphate rock (for example, ⅓ upgraded slime and ⅔ high grade phosphate rock) to produce a feed stock having a sufficiently high BPL (above 64 BPL) to be commercially acceptable for the industrial manufacture of phosphate fertilizers and animal feed supplements.

DETAILED DESCRIPTION OF THE PREFERRED EMBODIMENT

Phosphate rock, of the type used for the industrial manufacture by the wet process of phosphate based fertilizers and animal feed supplements, occurs at various places in the earth in the form of a matrix of pebbles (below about ¼ inch) and smaller particles of about the size of fine sand. After being mined (usually strip mining for Florida deposits and slope mining for Idaho deposits) the matrix is first piled and then taken by trucks to a wash plant, where it is washed with water on screens. Big pieces in the matrix are removed, crushed to smaller sizes and then rewashed on the screens.

Such screening and washing separates the matrix into a pebble fraction and fines. Clay material in the matrix is removed by the washing and rejected as slime.

The fines then go to a flotation separation process, which separates the fines into a concentrate (fine phosphate rock of high BPL) and tailings, which are of such a low BPL content that the tailings normally are simply put aside and not used for phosphate manufacturing purposes.

The concentrate is accumulated in a pile, or a silo, where the excess water drains off following which it is dried by heating in a drier at a temperature sufficient to drive off the remaining water (10–12%).

Figure 1:
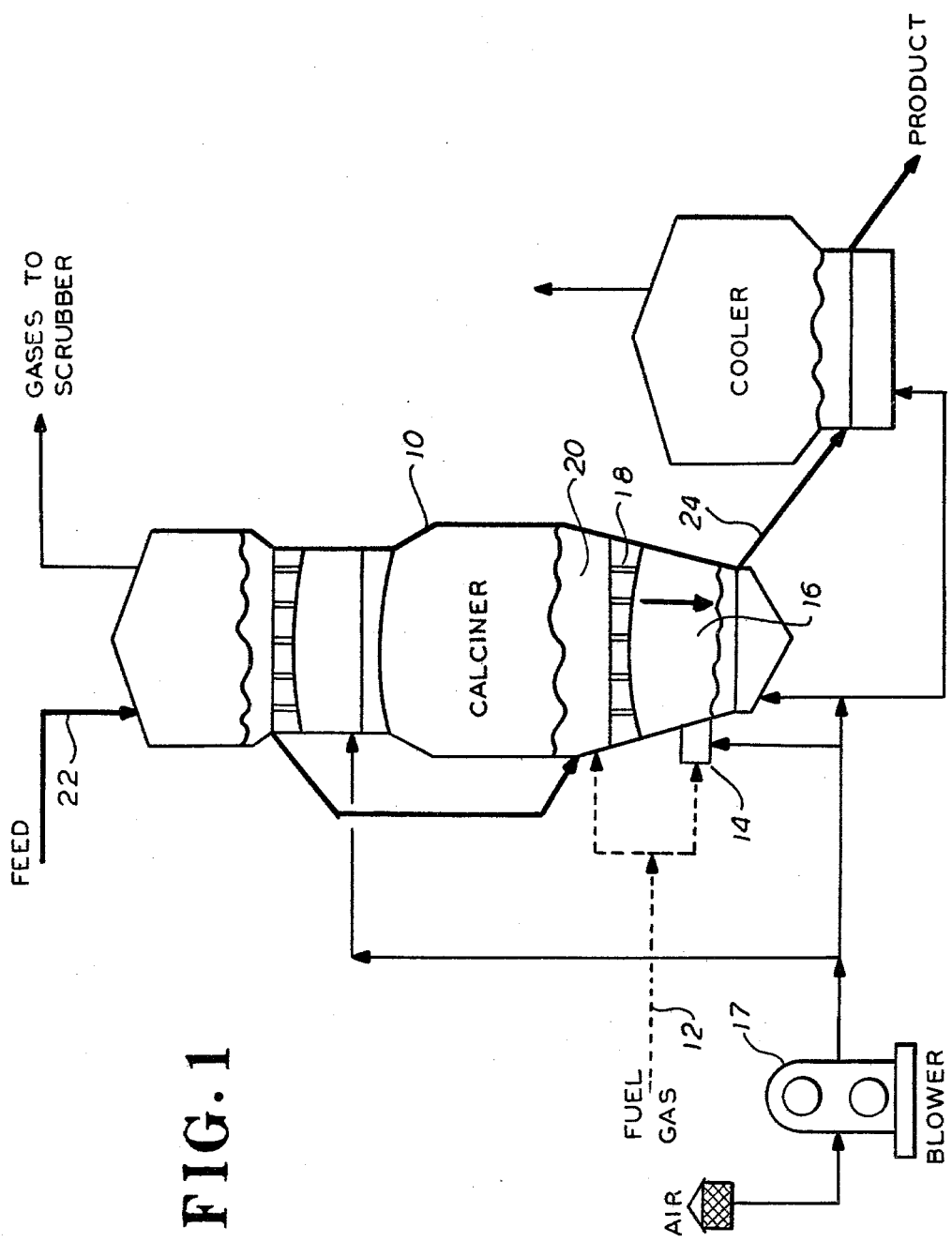
FIG. 1 is a schematic view illustrating a heating chamber for calcining the phosphate ore matrix, or the phosphate rock following conventional beneficiating thereof, preparatory to magnetic separation according to the present invention.

Either the pebble fraction (after drying if necessary) and/or the dried concentrate is then, by the first step of the present invention, delivered to a high temperature heater or calciner, such as shown in FIG. 1.

This can be a conventional type of calciner 10 heated by fuel gas introduced through a fuel line 12 and a fuel/air mixer 14 into a combustion chamber 16 also supplied with combustion air by a blower 17. The hot combustion products from the combustion chamber 16 are discharged upwardly through the calciner, passing through flues 18 into the heating chamber, or retort, 20 of the calciner. The retort 20 is supplied with dried rock concentrate and/or pebbles through a product inlet pipe 22 on the top of the retort. Concentrate and/or pebbles flow by gravity from the feed line 22 into the retort. On the other side of the calciner, a product outlet pipe 24 is open to the retort chamber and allows the calcined pebbles and/or concentrate to flow by gravity out of the retort and on to a cooler (of any conventional type) wherein the hot calcined material is cooled, after which it may be piled or otherwise stored. The fuel and air flow, and the feed rate through line 22, are adjusted to maintain the calcining temperature in the retort within a critical temperature range, from about 1400° F. to about 1600° F., preferably about 1475° F.

In the second step of the invention, the calcined pebbles and/or concentrate is fed into hopper 30 of the magnetic separator 32 (FIG. 2), from which it drops on to the elongated Table 34 of a vibrating feed comprising a motor 36 which vibrates an anvil or boss 38 connected thereto and which intermittently strikes a bracket 40 attached to the underside of the table so as to impart vibratory motion thereto. Flexible supports 42, 44 support the table on a fixed frame 46 so as to permit such motion relative to the frame.

Figure 3:
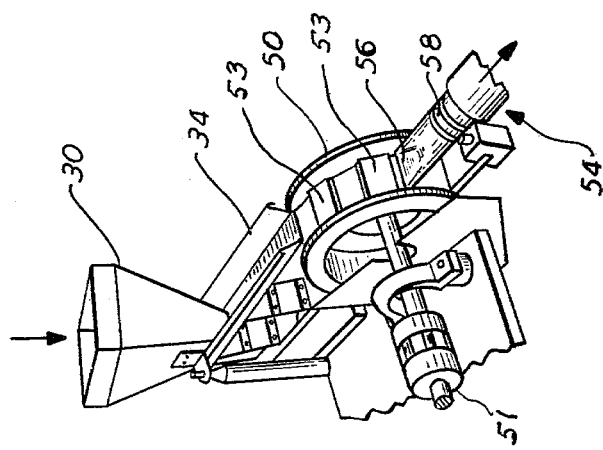
FIG. 3 is a perspective view of the magnetic wheel of FIG. 2, showing the arrangement of the magnets thereon.
Figure 2:
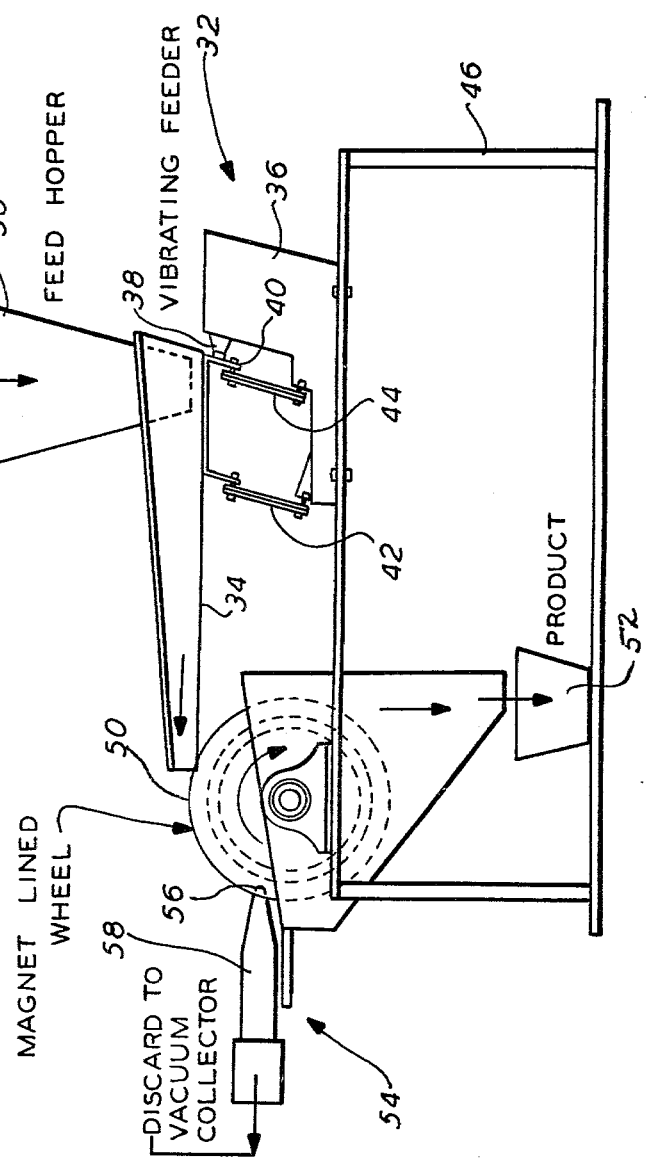
FIG. 2 is a schematic view illustrating an apparatus for magnetically separating the matrix, or the phosphate rock, after calcining, into two different fractions, one of increased BPL and one of lowered BPL relative to the BPL of the original matrix or rock.

Table 34 slopes slightly, to the left as shown in FIG. 2, so that the material dropping onto the table from hopper 30 will flow along the table and be dropped off the left end thereof onto a magnet lined wheel 50, which is constantly being rotated by a motor 51 (FIG. 3).

The wheel 50 rotates clockwise, as shown by the arrow, and as it rotates it is continuously covered over its upper surface by the material which drops thereon from the left end of table 34.

In the calcining step of FIG. 1, different fractions of the phosphate pebbles and/or concentrate are made differentially responsive to magnetic force, so that one fraction of the calcined material is rendered more responsive magnetically than other fractions thereof. Wheel 50 is covered, as shown in FIG. 3, by a circumferentially extending series of strong Sm Co permanent magnets 53. These magnets each have large flat surfaces and produce magnetic fields of very high intensity, so as to be able to retain on the surface thereof by magnetic attraction against the force of gravity that fraction of the pebbles and/or concentrate which is responsive magnetically. Thus, as wheel 50 revolves the non-magnetic fraction of the material will drop off the wheel by the force of gravity and fall into the bin 52, whereas the magnetically responsive material will be retained, by magnetic force, on the surfaces of magnets 53 as the wheel revolves.

The strength of a magnet may be expressed as the product of $B \times H$ (called the energy product) whereon $B = d\phi/dA$ Gauss (CGS unit) and $H = dF/dL$ Oersted (CGS unit). The Sm Co magnets used in the actual reduction to practice of this invention (see the specific examples below) had a 16 to 18 million energy product. The strength or intensity of the magnetic field utilized for separating the magnetic and non-magnetic fractions after calcination according to this invention should be very high, such as can be provided by Sm Co magnets, but the specific magnetic strength selected in best determined individually by experiment for the particular phosphate rock to be beneficiated by the process of the invention.

The fraction of the calcined material which is responsive magnetically will continue to be held by magnetic force on the surfaces of the wheel magnets until the magnets successively reach the nozzle 56 of the collector apparatus 54. This collector apparatus comprises nozzle 56 and a vacuum source (in the nature of a large vacuum pump, not shown). Air drawn in to the open end of nozzle 56 "sucks" the pebbles and/or concentrate held on the surfaces of the magnets off said surbaces and into the pipe 58 of the vacuum collector, from which the magnetically responsive fraction is delivered to a separate bin (not shown) wherein it is collected. Thus, the calcined rock or concentrate is separated into two fractions, one magnetically attractable and the other not magnetically attractable, and deposited into separate bins.

Phosphate ore is found in many different deposits throughout the world. Each deposit varies somewhat in its composition from other deposits, at other locations. Typical approximate compositions of phosphate rocks from some major deposits are listed below:

| APPROXIMATE COMPOSITION OF PHOSPHATE ROCKS (Composition after washing or other beneficiation) | | | | | | |
|---|---|---|---|---|---|---|
| | U.S.A. | | | AFRICA | | |
| Constituent | Western | Tennessee | North Carolina | Morocco | Algeria Tunisia | Tunisia (Gafsa) |
| $P_2O_3$ | 27–33 | 30–36 | 30.7 | 32–36 | 27–31 | 29.95 |
| CaO | 43–47 | 42–49 | 49.4 | 46–54 | 40.52 | 48.75 |
| F | 2.9–6.9 | 3.2–3.8 | 3.5 | 2.5–5.0 | 3.5 | 3.5 |
| $Fe_2O_3$ | 0.5–2.1 | 2.2–2.4 | 0.7 | 0.7–1.8 | 0.5–2.1 | 0.90 |
| $Al_2O_3$ | 0.5–1.9 | 1.2–2.7 | 0.4 | 0.7–1.6 | 0.5–2.1 | 0.50 |
| $Na_2O$ | 0.1–0.8 | 0.1–0.3 | — | 1.19 | 1.25 | 1.25 |
| $K_2O$ | 0.2–0.6 | 0.2–0.7 | — | 0.16 | 0.44 | 0.45 |
| $SiO_2$ | 5–17 | 3–9 | 3.9 | 1–2.6 | 6–8 | 3.50 |
| Cl | 0.03 | 0.07 | — | | | 0.10 |
| $CO_2$ | 0.7–4.2 | 1.0–2.0 | 5.6 | 2.8–4.4 | 0.1–10 | 4.90 |
| Organic carbon | 0.7–2.7 | 0.025 | 0.1 | 0.17 | 0.80 | — |

| ANALYSIS OF A TYPICAL FLORIDA PEBBLE PHOSPHATE | |
|---|---|
| Ingredient | Percent range |
| Calcium oxide (CaO) | 46–50 |
| Phosphorus pentoxide ($P_2O_5$) | 30–36 |
| Carbon dioxide ($CO_2$) | 1.5–4.4 |
| Fluorine (F) | 3.3–4 |
| Ferric oxide ($Fe_2O_3$) | 0.7–2.6 |
| Alumina ($Al_2O_3$) | 0.7–1.1 |
| Silica ($SiO_2$) | 7.3–9.8 |
| Magnesia (MgO) | 0.04–0.5 |
| Sulfur trioxide ($SO_3$) | 0.3–1.5 |
| Total water | 7.3–2.6 |

As will be seen from the above composition tables, phosphate ores and phosphate rock contains iron oxide. Although the theory is not certain, it is believed that at least part of the iron oxide in the ore or rock becomes magnetically responsive during the calcination step. This would appear to be confirmed by the fact that analysis of samples after calcining and magnetic separation show the magnetically responsive fraction always to have higher iron content than the non-magnetic fraction.

In some phosphate ores and rocks, the iron compounds are believed associated or "tied-up" with the phosphate values, whereas in other phosphate ores and rocks the iron compounds are believed divorced, or separate from the phosphate values. This would explain why, with some ores and rocks the BPL is increased in the magnetic fraction whereas in other ores and rocks the BPL is increased in the non-magnetic fraction.

The method of the present invention is not applicable to all phosphate ores, from every known deposit. For example, application of the method to some Algerian and Moroccan rock has not produced sufficient beneficiation to provide a substantial commercial benefit. With respect to those phosphate ores which can be substantially beneficiated by the method of the invention, differences have been discovered in the way in which the method should be practiced. The first step of the method, calcining within a critical temperature range, is used in every case, for whatever phosphate ore is to be beneficiated. It is this step that differentially magnetizes the different fractions of the ore and enables the magnetic separation to be made. However, depending on the particular ore being beneficiated, the results of the calcining step vary. For some phosphate ores, the calcining step has been found to increase the BPL of the fraction rendered magnetic by the calcining step, with the BPL of the other (non-magnetic) fraction being decreased. For other phosphate ores, the calcining step had been found to decrease the BPL of the fraction rendered magnetic, and to increase the BPL of the non-magnetic fraction.

Therefore, in the commercial practice of the invention the particular rock to be upgraded in BPL is first tested by chemical analysis, after being calcined and then magnetically separated according to the invention, to determine in which fraction, the magnetic or the non-magnetic fraction, the phosphorus bearing material is entrained or retained in greater amounts. On the basis of this information, that fraction which is increased in BPL by magnetic separation following calcination can be selected for use as the feed stock for the fertilizer, or animal feed supplement, manufacturing process.

SPECIFIC EXAMPLES

The following specific examples illustrate actual practice of the invention on a laboratory scale. In these examples a series of phosphate rock samples were subjected to calcination within the critical temperature range and then passed through a strong magnetic field according to the method of this invention to separate two fractions; a magnetically attractable fraction and a non-magnetically attractable fraction, one of which fractions being beneficiated with respect to the original bone phosphate of lime (BPL) content in the sample being processed.

Each sample was recovered from a phosphate-containing ore according to the following general procedure:

A series of phosphate-containing ore (matrix) samples comprising phosphate rock, silica and clay was mined from various regions in the United States. Each matrix sample was transported to a wash plant where it was washed with water, crushed and washed again on a screen. The wash water comprised a slurry of the clay (slime) which was separated from the system. The pebble residue on the screen was separated from the fines containing substantial amounts of phosphate rock and silica. The fines were sent to a flotation separator to separate and recover a concentrate and to remove tailings (sand). The concentrate was then dried to remove water.

The Samples used in these Examples were a Western Rock concentrate, (Ex. 1), Western Rock tailings, (Ex. 2), a North Florida pebble, (Ex. 3), a South Florida pebble, (Ex. 4) and a South Florida flotation feed fine and pebble sample, (Ex. 5).

EXAMPLE 1

In Example 1, about 2457.9 gms. of a Western Rock concentrate sample first being treated as described above was separated into a number of increments of varying mesh sizes using a series of screens. Table 1 below lists the mesh sizes of the screens, the weight in grams of each increment and the percent by weight of total sample of each increment.

TABLE 1

| Increment Mesh Size (U.S. SIEVE NO.) | Wt. (gms.) | Wt. % |
|---|---|---|
| + 50 | 776.0 | 30.46 |
| + 70 | 240.4 | 9.44 |
| + 100 | 345.7 | 13.57 |
| + 140 | 326.9 | 12.83 |

TABLE 1-continued

| Increment Mesh Size (U.S. SIEVE NO.) | Wt. (gms.) | Wt. % |
|---|---|---|
| + 200 | 393.4 | 15.44 |
| − 200 | 465.5 | 18.27 |
| Total | 2547.9 | 100.00 |

Each increment was calcined at about 1475° F. and then passed through a strong magnetic field (produced by a high strength SmCo magnet) using the apparatus of FIG. 2 to separate and recover a magnetically attractable fraction (MAGNETIC) and a non-magnetically attractable fraction (NON-MAGNETIC).

The wt. % and BPL for each increment was measured before passage into the magnetic field and for each fraction, magnetic and non-magnetic, after passage through the field.

Table 2 below summarizes the results.

TABLE 2

| | | FRACTIONAL SEPARATION IN MAGNETIC FIELD | | | |
|---|---|---|---|---|---|
| | | NON-MAGNETIC | | MAGNETIC | |
| Increment | BPL | (wt. %) | BPL | (wt. %) | BPL |
| + 50 | 73.9 | 69 | 79.5 | 31 | 61.20 |
| − 50 + 70 | 79.5 | 60 | 82.74 | 40 | 74.77 |
| − 70 + 100 | 78.0 | 89 | 79.40 | 11 | 66.70 |
| − 100 + 40 | 75.3 | 71 | 77.30 | 29 | 67.80 |
| − 140 + 20 | 69.6 | 52 | 73.4 | 48 | 65.60 |
| − 200 | 49.6 | 56 | 51.2 | 44 | 46.9 |

As Table 2 shows the BPL difference between magnetic and non-magnetic varies from 4.30 to 18.3 depending on the screen size of the increment.

EXAMPLE 2

In example 2, a sample of Western Rock tailings having an original BPL of 43.11 was divided into four increments. The first two increments were calcined at about 1475° F. but differed in the length of time of calcination, and the last two increments were calcined at about 1750° F. for different lengths of time. The BPL content was measured for each increment after calcination. The increments were passed through a strong magnetic field produced by a high strength SmCo magnet as described above to separate a magnetic and non-magnetic fraction.

Table 3 summarizes the results.

TABLE 3

| In-cre-ment | Calcination Temp. °F. | BPL After Calcin-ation | FRACTIONAL SEPARATION IN MAGNETIC FIELD | | | |
|---|---|---|---|---|---|---|
| | | | NON-MAGNETIC | | MAGNETIC | |
| | | | (wt. %) | BPL | (wt. %) | BPL |
| 1 | 1475 (20 min.) | 47.2 | 24.26 | 56.6 | 75.74 | 44.9 |
| 2 | 1475 (40 min.) | 47.8 | 36.08 | 54.2 | 63.92 | 44.9 |
| 3 | 1750 (20 min.) | 47.7 | 41.26 | 52.8 | 58.24 | 44.6 |
| 4 | 1750 (40 min.) | 48.5 | 45.40 | 51.3 | 54.60 | 46.2 |

As Table 3 shows, BPL beneficiation of each increment occurred in the non-magnetic fraction but varied depending on the temperature of calcination. With respect to the BPL content after calcination, the non-magnetic fraction of increments 1 & 2 was 13.5% and 11.1% higher in BPL. respectively; and in increments 3 and 4 it was 9.7% and 8.2% higher, respectively. This indicates that calcination temperatures above about 1600° F. tend to diminish BPL beneficiation after magnetic separation. Table 3 also shows that calcining times greater than about 20 minutes tend to decrease beneficiation after magnetic treatment.

Further, calcining at temperatures above about 1600° C. causes the rock or concentrate to become "glassy", and hard to digest in the phosphoric acid manufacturing process.

It should be mentioned that tailings, because of their low BPL content are worthless. However, if tailings beneficiated according to this method are then combined with high grade phosphate rock, a blend of material can be obtained, having a BPL content of 64 wt.% or more.

EXAMPLE 3

In example 3, a North Florida pebble having an original BPL content of 61.33 was calcined at about 1470° F. and subjected to magnetic separation as above. The BPL of the sample of the calcination and of the fraction after magnetic separation by a high strength SmCo magnet was measured.

Table 4 summarizes the results.

TABLE 4

| BPL After Calcination (wt. %) | FRACTIONAL SEPARATION IN MAGNETIC FIELD | | | |
|---|---|---|---|---|
| | NON-MAGNETIC | | MAGNETIC | |
| | (wt. %) | BPL | (wt. %) | BPL |
| 65.93 | 61.2 | 64.62 | 38.8 | 68 |

As Table 4 shows beneficiation occurred in the magnetic fraction rather than in the non-magnetic fraction as in Examples 1 & 2.

EXAMPLE 4

In Example 4, a South Florida pebble having an original BPL of 45.23 was subjected to calcination and magnetic separation using the procedure of Example 3. The magnetic fraction, however, was separated into +70 mesh and −70 mesh sizes and its BPL content determined.

Table 5 summarizes the results.

TABLE 5

| BPL After Calcination (wt. %) | FRACTIONAL SEPARATION IN MAGNETIC FIELD | | | |
|---|---|---|---|---|
| | NON-MAGNETIC | | MAGNETIC | |
| | (wt. %) | BPL | (wt. %) | BPL |
| 48.66 | 49.29 | 36.70 | 21.37 | 62.68 (+70 mesh) |
| | | | 29.34 | 58.53 (−70 mesh) |

Table 5 shows BPL beneficiation occurred in the magnetic sample as in Example 3. The results are more dramatic, however, in that the BPL content was 17.45 higher in the +70 mesh magnetic fraction and 13.30 higher in the −70 mesh magnetic fraction.

EXAMPLE 5

In Example 5 a South Florida flotation feed sample (5a) and pebble (5B) containing an original BPL of 22.81 and 37.20 respectively were calcined at about 1470° F., magnetically separated with a high strength SmCo magnet and measured again for BPL content.

Table 6 summarizes the results.

TABLE 6

| SAMPLE | | FRACTIONAL SEPARATION IN MAGNETIC FIELD | | | |
|---|---|---|---|---|---|
| | | NON-MAGNETIC | | MAGNETIC | |
| | | (wt. %) | BPC | (wt. %) | BPL |
| Flotation Feed | (5A) | 78.3 | 12.84 | 21.7 | 53.42 |
| Pebble | (5B) | 68.3 | 38.86 | 21.7 | 53.16 |

EXAMPLE 6

A sample of 77.4 BPL Western rock was calcined and then separated magnetically into two fractions as described hereinabove, one fraction being of 89% 79 BPL and the other fraction of 11% 64.5 BPL. A separate sample of 46 BPL (Western Tailings) was similarly converted to a fraction of 64% 52 BPL and 36% 38 BPL. One third of the upgraded (52 BPL) tailings was then mixed with two-thirds of the upgraded rock (79 BPL) to produce a final feed stock of 70 BPL rock.

I claim:

1. A method for increasing the bone phosphate of lime (BPL) content of a phosphate feed stock material to be used for the manufacture of phosphate fertilizers or phosphate animal feed products and which contains fractions respectively of relatively low BPL content and relatively high BPL content which fractions are not differentiated magnetically, comprising, heating said feed stock material to a temperature within the range from about 1000° F. to about 1600° F. for a time sufficient to increase the magnetic attraction of one of said fractions relative to the other of said fractions, and separating said fraction of increased magnetic attraction from the other of said fractions by means of a magnetic field to form two separate fractions one of which has increased BPL and the other of which has decreased BPL.

2. A method according to claim 1, in which said material is heated to a temperature within the range from about 1400° F. to about 1600 PF.

3. A method as recited in claim 1, in which the feed stock material is phosphate slime or tailings, and in which the separated fraction which has increased BPL is mixed with high grade phosphate rock prior to use for the manufacture of fertilizers or animal feed products.

4. A method according to claim 3, in which the slime or tailings is heated to a temperature within the range from about 1400° F. to about 1600° F.

* * * * *